Figure 13:
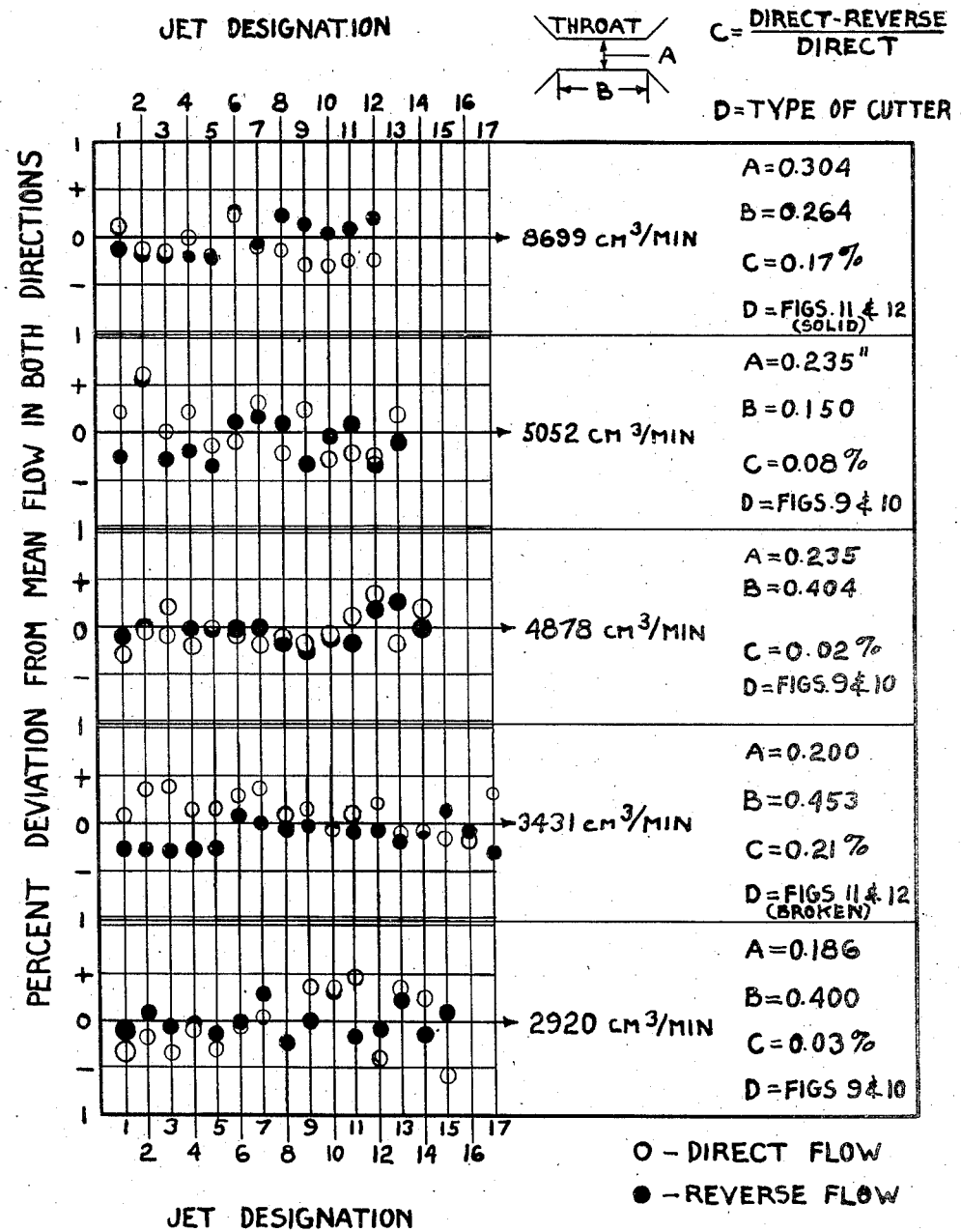

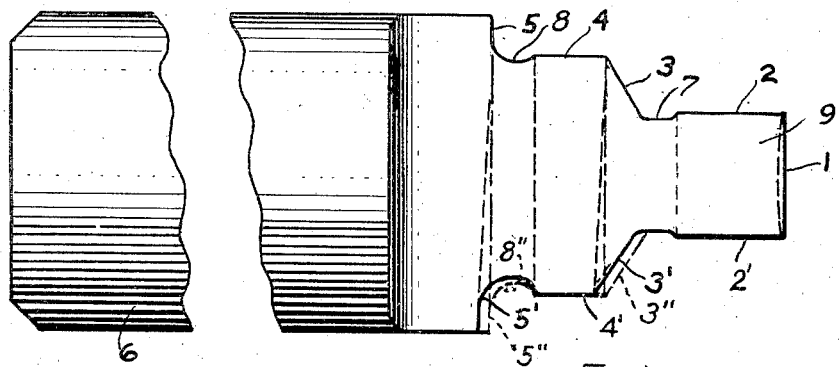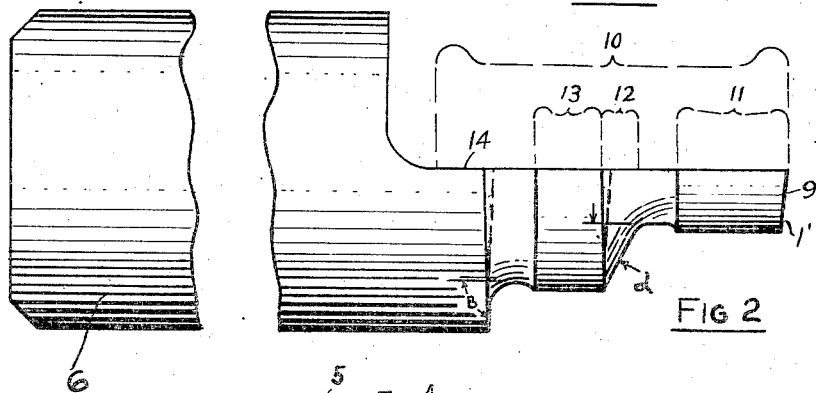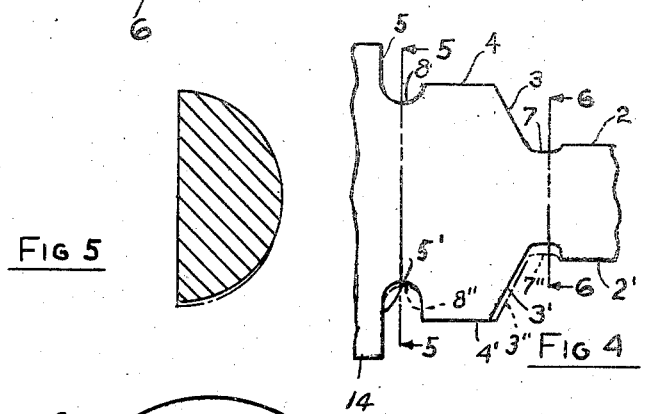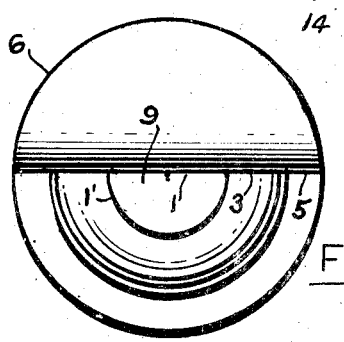

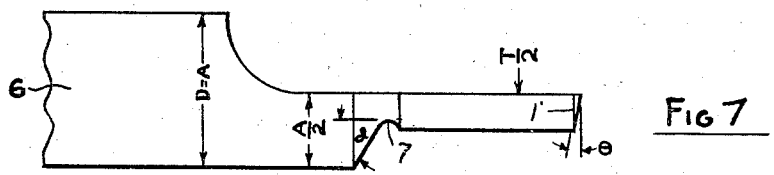
Fig 7
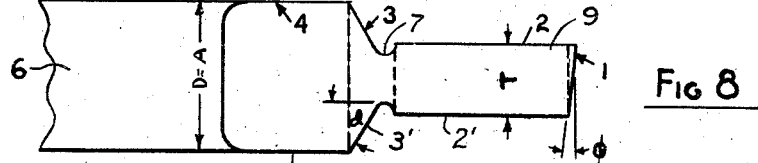
Fig 8
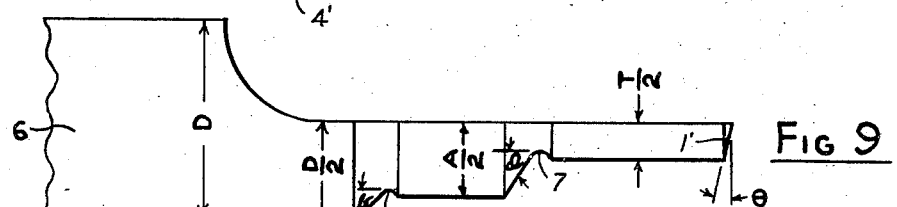
Fig 9
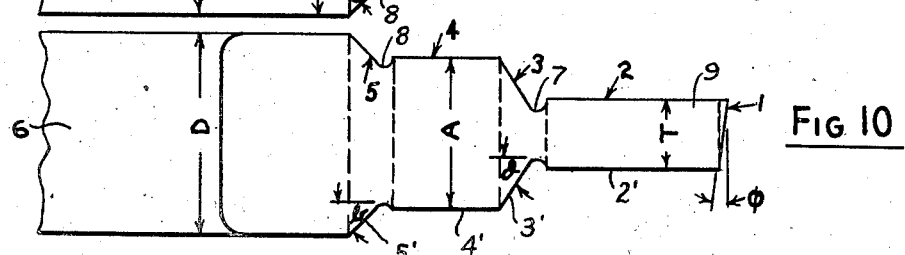
Fig 10
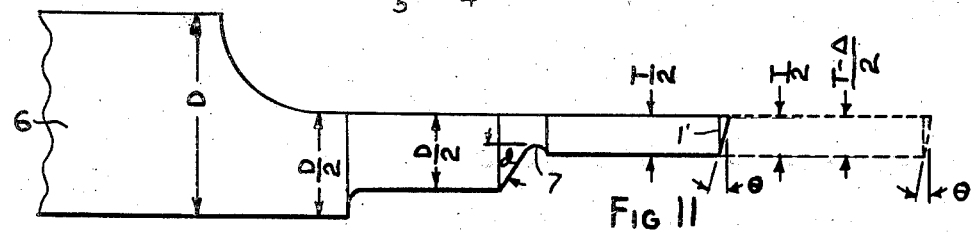
Fig 11
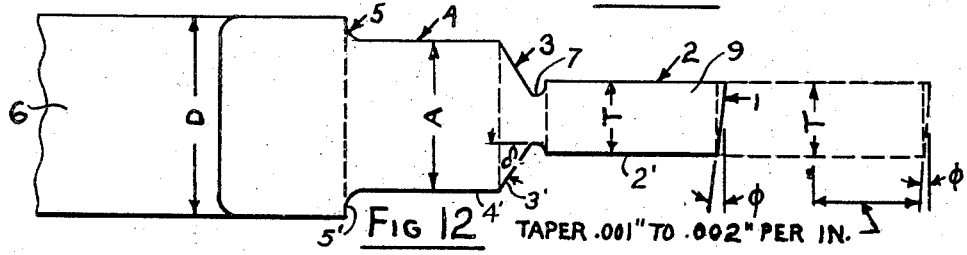
Fig 12   TAPER .001" TO .002" PER IN.
D = DIAMETER OF CUTTER SHANK
A = DIAMETER OF JET APPROACH
T = DIAMETER OF JET THROAT
U = DEPTH OF UNDERCUT
ANGLES θ & φ ARE SMALL CLEARANCE ANGLES Patented Oct. 22, 1946

2,409,616

UNITED STATES PATENT OFFICE 2,409,616

UNITARY BORING AND COUNTERSINKING TOOL

Milton H. de Bruin, Washington, D. C., and Ernest F. Fiock, Chevy Chase, Md.

Application August 15, 1944, Serial No. 549,600

9 Claims. (Cl. 77—66)

(Granted under the act of March 3, 1883, as amended April 30, 1928; 370 O. G. 757)

In many carburetors the primary metering of the fuel is accomplished by one or more fixed jets which are essentially removable metal parts having appropriate flow passages machined in them. The finish of these jets is usually critical with reference to the resulting flow characteristics. The cutting tools comprising the present invention were discovered to form the passages in such metering jets in a faster and more reproducible manner than heretofore. The flow characteristics of jets made by these cutting tools are relatively comparable because of the uniform finish of the jets that is made possible.

An object of the present invention is to devise a single tool for drilling and finishing off a jet so as to enable control of comparable flow characteristics in the successive jets made thereby.

A further object is to construct a tool for making jets by one operation where several were previously required.

A further object is to make reproducible jets so as to eliminate the necessity of flow testing each individual jet for the purpose of matching jets with like flow characteristics.

A further object is to make a tool for drilling jets so as to eliminate any possibility of burrs on the internal edges between the bore and counterbore.

Other and more specific objects will appear as the description of the details of the present invention proceeds, having reference to the accompanying drawings, wherein:

Figs. 1, 2 and 3 are the three normal views of one form of cutting tool made according to the present invention, Fig. 4 is a portion of a modification of the above form, Figs. 5 and 6 are sections taken along the correspondingly marked section lines of Fig. 4, Figs. 7 and 8 illustrate another form of tool made in accordance with this invention, the two views being taken at right angles to each other, Figs. 9 and 10 similarly illustrate another form, Figs. 11 and 12 illustrate still another form with a modification shown in broken lines, and Fig. 13 shows a set of charts for different size jets made by cutters of three different forms as indicated, and illustrates the small amount of variation in flow characteristics of the jets formed by the cutters made in accordance with the present invention.

The same designations are used for similar parts in the several figures of the drawings.

The general construction of the present tools is a half round cutting head 10 on the end of a full round or cylindrical shank 6. The cutting edges are shown at 1, 2, 3, 4 and 5. The non-cutting edges 1', 2', 3', 4' and 5' are rounded off, and the surfaces behind the cutting edges 3 and 5 are preferably relieved from the cutting edge gradually to a maximum of five to ten thousandths of an inch at the opposite side, as shown in Figs. 1 to 6. This relief may extend into the entire groove 7 or 8, respectively, adjacent each of these edges as may be seen in Figs. 4 to 6. These clearances indicated by the light dotted lines 3", 5", 7" and 8" are somewhat enlarged in the drawings for clarity.

If successive carburetors are to deliver like and proper amounts of fuel, it is essential that the corresponding fixed jets therein have the same flow characteristics, within very narrow limits. Experience has shown that successive jets now produced by conventional methods of drilling, followed by reaming or broaching, often vary considerably in flow characteristics. It has, therefore, been necessary to flow test each production jet, and the percentage of rejections was found to be high, even under current rather wide limits of acceptability. Obviously all the time and expense involved in making the flow passage and in the flow testing of a rejected jet was wasted, even though the jet body might have been used subsequently with an enlarged flow passage.

Another disadvantage of the prior method of producing jets by drilling, then reaming or broaching, was that such operations left burrs of different and uncontrollable magnitudes at the two ends of the throat of the jet. Since the condition of the metering edge, that is, the edge of the throat through which the fluid enters, has a primary effect upon the flow, it is apparent that jets made by the prior methods could not have identical flow characteristics for flow in either direction. Since the direction of flow through the jets is not the same for all carburetors, it has been found necessary to designate the direction of flow in which existing jets are to be used.

During a study of the behavior of carburetor jets of existing and modified design, the present special cutting tools for forming the flow passages of jets free from the aforementioned limitations have been evolved. The advantages of the new cutters are as follows:

(a) A group of jets made with a given cutter flow alike, within ± 0.5 percent or less of the mean, with few, if any exceptions. This fact is illustrated for cutters of five different sizes and three different types in Fig. 13.

(b) It is also apparent from Fig. 13 that a jet made with a given cutter can be made to flow essentially the same in either direction.

(c) No preliminary cutting of the flow passage is required, as cutters of this type may be put directly through the solid jet blanks.

(d) The approach and exit openings, serving to protect the throat of the jet from mechanical damage, can be formed in the same operation as the throat, and also without preliminary cutting.

(e) The flow passage can be shaped as desired, by giving the cutting tool an appropriate shape during its manufacture.

(f) To form a complete and symmetrical flow passage involves the use of a single tool cutting first from one end of the jet and then from the other, or two identical cutting tools, one cutting from one end and the second cutting from the other end after the first is withdrawn.

(g) Either the tool or the jet may be rotated during the boring operation, and either may be moved axially as the cutting progresses.

(h) The variation among a group of production jets can be reduced to considerably less than ±0.5 with careful operation and a considerable saving in time required for making the jets can be accomplished, along with a saving of all the time previously required for testing.

(i) Jets made with the new tools are so nearly alike that only representative samples need to be flow tested. For example, each hundredth jet produced with a given tool might be flow tested to insure that the tool has not worn sufficiently to change the flow of the jets. The saving in time and production cost from this feature alone would constitute a considerable portion of the present total cost of the jets.

It is a well known fact that the upstream edge formed by the throat of a jet and the surface which meets the throat, no matter what may be the angle of such meeting, is of primary importance in determining the flow characteristics of jets of a given throat diameter. Hence it was seen that the problem of producing matched jets could be solved if means could be found for making this edge identical in successive jets, since there is little difficulty involved in making the throat diameters identical. Likewise, jets can be made to flow the same in either direction if the edges of the throat are identical at its two ends. It was found that all of these desired results could be attained by using cutters such as those herein shown.

The most important feature, and one which is novel to these cutters, is the provision of annular grooves in the boring portion 10, as shown at 7 and 8 in Figs. 2 and 7 to 12. How these grooves are responsible for the reproducibility of the jets produced will be apparent in the description that follows:

The cutting tip 9 formed at the intersection of edges 1 and 2 serves as a boring tool to cut the jet throat, with cutting edge 2 of the end section 11 giving the final finish to the inner surface of the throat. By this boring action the throat is cut truly round. If a burr is formed by the initial action of the tool in starting the throat, this burr is later removed by the cutting edge 3 on the semi-conical or step section 12 during the subsequent motion of the tool into the jet. Cutting edge 3, in its turn, may cause a burr to be formed in the throat, this burr being allowed to persist in the groove of the cutting tool. However, if the rotation of the cutter is continued as it is withdrawn from the jet, cutting edge 2 again becomes effective and the remaining burr is thus removed. Therefore, the all-important edge of the throat is left entirely free from roughness of sufficient magnitude to influence the flow, because the cutter acts as its own deburring tool during its withdrawal. The jet can then be turned around, the same tool introduced from the other side, and the symmetrical flow passage can be completed.

It is also apparent from the drawings that the cutting tools can be made to cut the approach and exit enlargements as well as the throat. Cutting edge 4 is effective for this action. If it is desired to leave the outer edges of the approach and exit sharp, 90° angles, a tool of the type shown in Figs. 7 and 8 is adequate. If it is desired to put a straight chamfer on the outer edges, a tool of the type shown in Figs. 9 and 10 will serve. The cutting edge 5 makes the chamfer, at any desired angle, and the edge of the chamfer is left free of burrs by the use of a groove between cutting edges 4 on the large bore section 13 and 5 on the finishing section 14.

The condition and shape of the approach and exit enlargements of the jet, and particularly the leading edges of these, exert a secondary but still considerable influence on the flow through the jet. Hence it may be found desirable to round the leading edge as a precaution against mechanical damage which might change the flow characteristics of the jet. The cutting edge 5, shown in the types of Figs. 11 and 12, cuts rounded leading edges which may be deeply scarred without changing the flow appreciably, thus reducing possibility of damage through handling. This tool is similar to those shown in Figs. 1 to 6, except that the groove between cutting edges 4 and 5 is omitted.

A slight modification is shown by the addition of the broken lines in Figs. 11 and 12. This tool differs from the type shown entirely in solid lines in these figures in a single feature, namely the shape and length of the tip which cuts the throat. This tip in the type shown partly in broken lines has an untapered length adjacent to cutting edge 3 and an end section, adjacent to edge 1, that is slightly tapered, as indicated by the dimensions in legend. The reproducibility of one group of jets made with a tool of this type is shown in the second strip from the bottom of Fig. 13.

The tools used on an experimental scale have been provided with a single cutting edge, and the edges trailing the cutting edges have been rounded slightly. The use of more complicated tools with multiple cutting edges, yet retaining the same features for forming reproducible metering edges of the throat, would probably yield jets even more nearly alike in flow characteristics than those shown in Fig. 13.

The dimensions, angles and clearances shown in Fig. 2 are subject to wide variation depending upon many factors such as the materials of the tool and of the jet blank, the size of the flow passage, the speed of the tool, etc. The fixing of optimum values for such dimensions is a well established part of the tool makers' art.

While the foregoing description has referred to the cutter as rotating and being fed into the jet blank, the same results are obtained with a rotating blank and a fixed tool, and either the tool or the blank may be moved axially as the boring progresses.

For each throat diameter there is a minimum value of throat length below which matched jets can be produced only by very exact control of throat length. For jets with throats longer than this minimum there is a considerable range of throat length within which neither the length of the throat nor the finish of its inner surface is critical. It is within this known usable range of throat length that both conventional methods and the proposed new method of cutting the flow passage can be applied most effectively.

In the foregoing discussion the application to metering fuel in carburetors has been used as an example, but the new cutter is also applicable to the forming of the flow passages in any kind of jet or orifice used in metering or controlling the flow of fluids, either gas or liquid.

The invention described herein may be manufactured and used by or for the Government of the United States of America for governmental purposes without the payment of any royalties thereon or therefor.

What is claimed is:

1. A unitary boring and countersinking tool comprising a round shank having at one end thereof a concentric half-round boring portion with an end section steppped down to a reduced diameter and having a substantially diametrical cutting edge at its end, said end being relieved away from the cutting edge toward the half-round edge, one of the axial edges of the reduced end section forming a cutting edge while the other axial edge is rounded off, a narrow annular relief groove at the inner end of the reduced section and a step section extending from the groove at a diameter smaller than that of the reduced section to the large diameter of the boring portion having a cutting edge on the same side of the boring tool as the said axial cutting edge on the reduced end section, the edge on the opposite side of the step section being rounded off.

2. A unitary boring and countersinking tool comprising a cylindrical shank having a concentric semi-cylindrical cutting portion comprised of two or more stepped sections joined by semi-conical step sections having a narrow annular relief groove between the smaller section and the conical sections, the edges on one side of the cutting portion and the edge at the outer end of the smallest section forming a continuous cutting edge, the edges on the opposite side of the cutting portion being rounded off and the outer end of the smallest section being relieved away from the cutting edge.

3. A unitary boring and countersinking tool comprising a cylindrical shank having a concentric semi-cylindrical cutting portion comprised of two or more stepped sections joined by semi-conical step sections having a narrow annular relief groove between the smaller section and the conical sections, the edges on one side of the cutting portion and the edge at the outer end of the smallest section forming a continuous cutting edge, the edges on the opposite side of the cutting portion being rounded off and the outer end of the smallest section being relieved away from the cutting edge, the surfaces of the conical sections being relieved gradually from the cutting edge back to the corresponding rounded edge.

4. A unitary boring and countersinking tool comprising a cylindrical shank having a concentric semi-cylindrical cutting portion comprised of two or more stepped sections joined by semi-conical step sections having a narrow annular relief groove between the smaller section and the conical sections, the edges on one side of the cutting portion and the edge at the outer end of the smallest section forming a continuous cutting edge, the edges on the opposite side of the cutting portion being rounded off and the outer end of the smallest section being relieved away from the cutting edge, the surfaces of the conical sections and of the grooves being gradually relieved from the cutting edges back to the corresponding rounded edges on the opposite side of the cutting portion.

5. A unitary boring and countersinking tool comprising a cylindrical shank and a concentric semi-cylindrical cutting portion having two or more semi-cylindrical successively reduced sections, at least the two smallest sections being joined by a semi-conical step section and a narrow annular relief groove at the rear of the smaller section, the juncture between the last two semi-cylindrical sections being formed by a fillet, the edges on one side of the cutting portion and the edge at the outer end of the smallest section forming the cutting edges of the tool, the edges on the opposite side of the cutting portion being rounded off, the surfaces behind the cutting edges between the cylindrical sections being gradually relieved to a maximum clearance at the edges on the opposite side of the cutting portion, and the surface on the outer end of the smallest section being relieved away from the cutting edge on said end.

6. A unitary boring and countersinking tool comprising a cylindrical shank and a concentric semi-cylindrical cutting portion having two or more semi-cylindrical successively reduced sections, at least the two smallest sections being joined by a semi-conical step section and a narrow annular relief groove at the rear of the smaller section, the juncture between the last two semi-cylindrical sections being formed by a fillet, the edges on one side of the cutting portion and the edge at the outer end of the smallest section forming the cutting edges of the tool, the edges on the opposite side of the cutting portion being rounded off, the surfaces behind the cutting edges between the cylindrical sections being gradually relieved to a maximum clearance at the edges on the opposite side of the cutting portion, and the surface on the outer end of the smallest section being relieved away from the cutting edge on said end, the smallest section of the cutting portion being comparatively long and slightly tapered at its outer end to produce a reaming effect.

7. A unitary boring and countersinking tool comprising a cylindrical shank having two or more consecutively reduced sections at the end thereof, said reduced sections and an adjacent section of the cylindrical shank being half cut away by an axial plane, the two end half-cylindrical sections being joined by a half-round step section having a narrow annular relief groove adjacent the smallest section, the half-cylindrical section of the shank being joined to the adjacent reduced half-cylindrical section by an annular relief groove and an annular step surface normal to the axis, the edges on one side of said cut away sections and the edge at the outer end of the smallest section forming the cutting edges of the tool, the edges on the opposite sides thereof being rounded off, the surfaces of the connecting sections between the stepped cylindrical sections being relieved gradually from the cutting side of the tool toward the opposite side thereof, and the surface at the outer end of the smallest section being slightly relieved back of the cutting edge.

8. A unitary boring and countersinking tool comprising a cylindrical shank having a concentric semi-cylindrical cutting portion comprised of two or more stepped sections joined by semiconical step sections having a narrow annular relief groove between the smaller section and the conical sections, the edges on one side of the cutting portion and the edge at the outer end of the smallest section forming a continuous cutting edge, the cutting edge at the outer end of the smallest section being formed at a slight angle to the normal, and the surface at said outer end being slightly relieved back of the cutting edge.

9. A unitary boring and countersinking tool comprising a cylindrical shank having two or more consecutively reduced sections at the end thereof, said reduced sections and an adjacent section of the cylindrical shank being half cut away by an axial plane, the two end half-cylindrical sections being joined by a half-round step section having an annular relief groove adjacent the smallest section, the half-cylindrical section of the shank being joined to the adjacent reduced half-cylindrical section by an annular relief groove and an annular step surface normal to the axis, the edges on one side of said cut away sections and the edge at the outer end of the smallest section forming the cutting edges of the tool, the edges on the opposite side thereof being rounded off, the surfaces of the connecting sections between the stepped cylindrical sections being relieved gradually from the cutting side of the tool toward the opposite side thereof, the cutting edge at the outer end of the smallest section being formed at a slight angles to the normal, and the surface at said outer end being slightly relieved back of the cutting edge.

MILTON H. DE BRUIN.
ERNEST F. FIOCK.